United States Patent Office 3,775,509
Patented Nov. 27, 1973

3,775,509
PROCESS FOR CONVERTING AN OLEFIN TO A PRODUCT CONTAINING HIGHER AND LOWER OLEFINS
Alan F. Ellis, Murrysville, and Edward T. Sabourin, Allison Park, Pa., assignors to Gulf Research & Development Company, Pittsburgh, Pa.
No Drawing. Filed Feb. 17, 1972, Ser. No. 227,233
Int. Cl. C07c 3/62
U.S. Cl. 260—683 D            10 Claims

ABSTRACT OF THE DISCLOSURE

A process for converting, by metathesis, a monoolefin having from 14 to 28 carbon atoms, particularly an alpha olefin having from 14 to 28 carbon atoms, to a product containing a mixture of olefins of higher and lower carbon number than the olefin charge, which involves contacting the olefin charge with a novel composition containing alumina, molybdenum or rhenium and silver or copper.

---

In our U.S. Pat. No. 3,595,920, dated July 27, 1971 and assigned to the same assignee as the present application, we have claimed a process for converting, by metathesis, a monoolefin having from four to 12 carbon atoms, particularly an alpha olefin having from four to 12 carbon atoms, to a product containing a mixture of olefins of higher and lower carbon number than the olefin charge which comprised contacting such olefin charge with a composition containing essentially alumina, molybdenum or rhenium and silver or copper. This invention relates to a process for converting, by metathesis, a monoolefin having from 14 to 28 carbon atoms, particularly an alpha olefin having from 14 to 28 carbon atoms or a mixture thereof, to a product containing a mixture of olefins of higher and lower carbon number than the olefin charge, which involves contacting the olefin charge with a novel composition containing alumina, molybdenum or rhenium and silver or copper. By "metathesis" we mean to include a process wherein two molecules of olefins, the same or different, in the presence of a catalyst and under reaction conditions, interact in a manner such that an olefinic fragment thereof reacts with another olefinic fragment to produce olefins containing combinations of such olefinic fragments. Metathesis as defined herein can be illustrated by the following reaction:

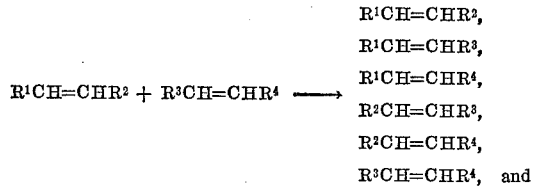

In the above equation $R^1$, $R^2$, $R^3$ and $R^4$, the same or different, can be an alkyl group or hydrogen. By "olefinic fragment" we mean to include each of "RCH" portions referred to above.

In a preferred embodiment, an alpha olefin charge is employed, isomerization of such charge is inhibited and the main products obtained are olefins composed of combinations of the alkyl-carrying fragments of the olefin charge and ethylene.

The olefin charge employed herein will have from 14 to 28 carbon atoms, preferably from 14 to 20 carbon atoms. Of these, normal alpha olefins are preferred. Examples of such olefins include tetradecene-1, hexadecene-1, heptadecene-3, octadecene-1, eicosene-1, docosene-1, tricosene-10, tetracosene-1, hexacosene-1, octacosene-1, etc.

The metathesis reaction can be effected simply by bringing the olefin charge in contact with the defined novel catalyst under selected reaction conditions. As noted, the catalyst is composed of alumina, molybdenum or rhenium and silver or copper. By "alumina" we mean to include $Al_2O_3$ conventionally employed in metathesis reactions. The proportion of molybdenum or rhenium present in the final composition can vary over wide limits, but in general will be present in amounts of about four to 12 percent, preferably about seven to nine percent, based on the total catalyst. The proportion of silver or copper present can also be varied over wide limits, but in general will be present in an amount of about 0.1 to about six percent by weight, preferably from about 0.5 to about three percent by weight, based on the total catalyst.

The preparation of the novel catalyst employed herein can be effected in any desirable manner. Thus, we can grind together the defined amounts of alumina, molybdenum or rhenium oxides and silver or copper oxides in preparing the catalyst used herein. A preferred manner, however, involves impregnating the alumina base, by the incipient wetness technique, with a sufficient amount of a salt of molybdenum, for example, ammonium molybdate, or a salt of rhenium, for example, ammonium perrhenate, from an aqueous solution, to introduce thereon the desired amount of mlybdenum or rhenium, calculated as metal, on the support. The resulting composition is dried, for example, in air at a temperature of about 110° to about 150° C. for about five to about 24 hours and then calcined in air at a temperature of about 400° to about 600 C. over a period of about one to about 24 hours. The resulting base is then impregnated, by the incipient wetness technique with a sufficient amount of a salt of silver, for example, silver nitrate or silver acetate, or copper, for example, cuprous chloride, cupric nitrate or cupric chloride, from an aqueous solution, to introduce thereon the desired amount of silver or copper, calculated as metal, on the support. The resulting composition is dried, for example, in air at a temperature of about 110° to about 150° C. for about five to about 24 hours and then calcined in nitrogen or air at a temperature of about 400° to about 600° C. over a period of about one to about 24 hours. The metals in the compositions are believed to be in the oxide form. Although the above procedure involves adding the molybdenum or rhenium salt to the alumina base first, similar results are obtained when the silver or copper salts are added initially.

The metathesis reaction conditions can be varied over a wide range. Thus, the olefin charge, in liquid form, can be passed over the defined catalyst at a liquid hourly space velocity (liquid volume of olefin feed per volume of catalyst per hour) of about 60 to about 0.2, preferably about 3.0 to about 0.5. The temperature during such treatment when molybdenum is present in the catalyst composition is about 90° to about 250° C., preferably about 100° to about 200° C., when rhenium is present about 25° to about 250° C. preferably about 60° to about 150° C. The pressure is not critical but is desirably low, preferably sufficient to maintain the charge in the reaction system in the liquid phase. Thus, the pressure can be from about 0 pound to about 500 pounds per square inch gauge, preferably from about 0 to about 100 pounds per square inch gauge. If the above procedure is operated in batch, the same conditions defined above can be used and contact or reaction time can be from about 10 minutes to about 240 minutes, preferably from about 30 minutes to about 120 minutes. The reaction is preferably carried out in the absence of solvents, but if solvents are used they should not adversely affect the course of the reaction nor react with the components of the reaction system but should have a boiling point sufficiently different from that of any of the components present in the reaction system. Thus, non-polar solvent, such as hexane, cetane, decane, etc., can be used. The amount of solvent would be that amount sufficient to maintain the contents of the reaction system in the liquid phase. Thus, on a volume base one volume of solvent per volume of reaction mixture can be used.

Preferably during the process vaporous products, for example, ethylene, are removed from the reaction zone as made. At the end of the reaction period any vaporous products still present are flashed off from the reaction product and the remaining product separated from catalyst in any convenient manner, for example, by filtration or decantation. The individual components of the reaction mixture can then be recovered from the reaction mixture by fractionation by conventional means.

The process defined herein can further be illustrated by the following:

EXAMPLE I

An alumina base carrying molybdenum and silver was prepared as follows. A gamma alumina (Ketjen) having a surface area of 282 square meters per gram, an average pore volume of 0.515 milliliter per gram and an average pore diameter of 74 angstroms was impregnated, by the incipient wetness technique, with sufficient ammonium molybdate, from an aqueous solution, to introduce eight percent by weight of molybdenum, calculated as metal, on the support. The resulting composition was dried at 120° C. over a period of three hours. The resulting base was impregnated, by the incipient wetness technique, with silver nitrate, from an aqueous solution, to introduce 1.8 percent by weight of silver, calculated as metal, on the base. The resulting compositions, in each instance, were dried at 120° C. over a period of 18 hours and then calcined at a temperature of 540° C. over a period of three hours in a stream of dry nitrogen. The metals in the compositions so prepared are believed to be in the oxide form.

A 50-gram sample of the above catalyst in the form of one-sixteenth inch extrudates was placed in a three-quarter inch inner diameter tubular reactor and activated in air at about 1050° F. Hexadecene-1 was then passed upwardly through the catalyst at a liquid weight hourly space velocity (pound of feed per hour per pound of catalyst) of 2.0 at 102° to 108° C. and atmospheric pressure. After about one hour the system was considered to be at equilibrium and analysis of the degassed liquid effluent showed a conversion of the $C_{16}$ olefin of 20.6 mol percent and a molar selectivity to $C_{30}$ internal olefin of 43.6 percent.

EXAMPLE II

The run of Example I was repeated with the passage through the catalyst bed of a feed containing $C_{22}$, $C_{24}$, $C_{26}$, $C_{28}$ and higher than $C_{28}$ in weight percents of 1.9, 31.6, 45.1, 16.8 and 4.6, respectively. Analysis showed a 24 percent molar conversion of the olefin feed with a molar selectivity to internal olefins falling within the $C_{40}$ to $C_{54}$ range of 30 percent.

EXAMPLE III

When the run of Example I was repeated using the same flow rate but with 17 grams of the same alumina base but carrying thereon eight percent by weight of molybdenum, eight mol percent of hexadecene-1 conversion was obtained with selectivity to $C_{30}$ internal olefins of only 30 mol percent.

EXAMPLE IV

Example III was repeated with 50 grams of the same catalyst used therein. Conversion of hexadecene-1 was 40.3 mol percent, with selectivity to $C_{30}$ internal olefin of only 16.2 mol percent.

Obviously, many modifications and variations of the invention, as hereinabove set forth, can be made without departing from the spirit and scope thereof, and therefore only such limitations should be imposed as are indicated in the appended claims.

We claim:

1. A process for converting, by metathesis, a monoolefin having from 14 to 28 carbon atoms to a product containing a mixture of olefins of higher and lower carbon number than the olefin charge which comprises contacting such olefin charge with a composition containing essentially alumina, molybdenum or rhenium and silver or copper at a temperature of about 25° to about 250° C.

2. The process of claim 1 wherein the olefin charge has from 14 to 20 carbon atoms.

3. The process of claim 1 wherein the olefin charge is composed of a normal alpha olefin having from 14 to 28 carbon atoms.

4. The process of claim 1 wherein the olefin charge is composed of a normal alpha olefin having from 14 to carbon atoms.

5. The process of claim 1 wherein the olefin charge is composed of a normal alphat olefin having from 14 to 28 carbon atoms and the catalyst is composed of alumina, molybdenum and silver and such contact is made at a temperature of about 90° to about 250° C.

6. The process of claim 1 wherein the olefin charge is composed of a normal alpha olefin having from 14 to 28 carbon atoms and the catalyst is composed of alumina, molybdenum and copper and such contact is made at a temperature of about 90° to about 250° C.

7. The process of claim 1 wherein the olefin charge is composed of a normal alpha olefin having from 14 to 28 carbon atoms and the catalyst is composed of alumina, about four to about 12 percent by weight of molybdenum and about 0.1 to about six percent by weight of silver and such contact is made at a temperature of about 100° to about 200° C.

8. The process of claim 1 wherein the olefin charge is composed of a normal alpha olefin having from 14 to 28 carbon atoms and the catalyst is composed of alumina, about seven to about nine percent by weight of molybdenum and about 0.5 to about three percent by weight of silver and such contact is made at a temperature of about 100° to about 200° C.

9. The process of claim 1 wherein the olefin charge is composed of a normal alpha olefin having from 14 to 28 carbon atoms and the catalyst is composed of alumina, about four to about 12 percent by weight of molybdenum and about 0.1 to about six percent by weight of copper and such contact is made at a temperature of about 100° to about 200° C.

10. The process of claim 1 wherein the olefin charge is composed of a normal alpha olefin having from 14 to 28 carbon atoms and the catalyst is composed of alumina, about seven to about nine percent by weight of molybdenum and about 0.5 to about three percent by weight of copper and such contact is made at a temperature of about 100° to about 200° C.

References Cited

UNITED STATES PATENTS

| | | | |
|---|---|---|---|
| 3,595,920 | 7/1971 | Ellis et al. | 260—683 |
| 3,658,930 | 4/1972 | Kenton et al. | 260—683 |

DELBERT E. GANTZ, Primary Examiner

C. E. SPRESSER, Jr., Assistant Examiner

PO-1050
(5/69)

UNITED STATES PATENT OFFICE
CERTIFICATE OF CORRECTION

Patent No. 3,775,509            Dated November 27, 1973

Inventor(s) Alan F. Ellis and Edward T. Sabourin

It is certified that error appears in the above-identified patent and that said Letters Patent are hereby corrected as shown below:

Column 4, line 3 of claim 4 should read

"20 carbon atoms".

Signed and sealed this 23rd day of April 1974.

(SEAL)
Attest:

EDWARD M.FLETCHER,JR.             C. MARSHALL DANN
Attesting Officer                    Commissioner of Patents